May 29, 1934.  H. THOMAS  1,960,930
KNIFE GUARD FOR SLICING MACHINES
Filed April 9, 1931.   5 Sheets-Sheet 1
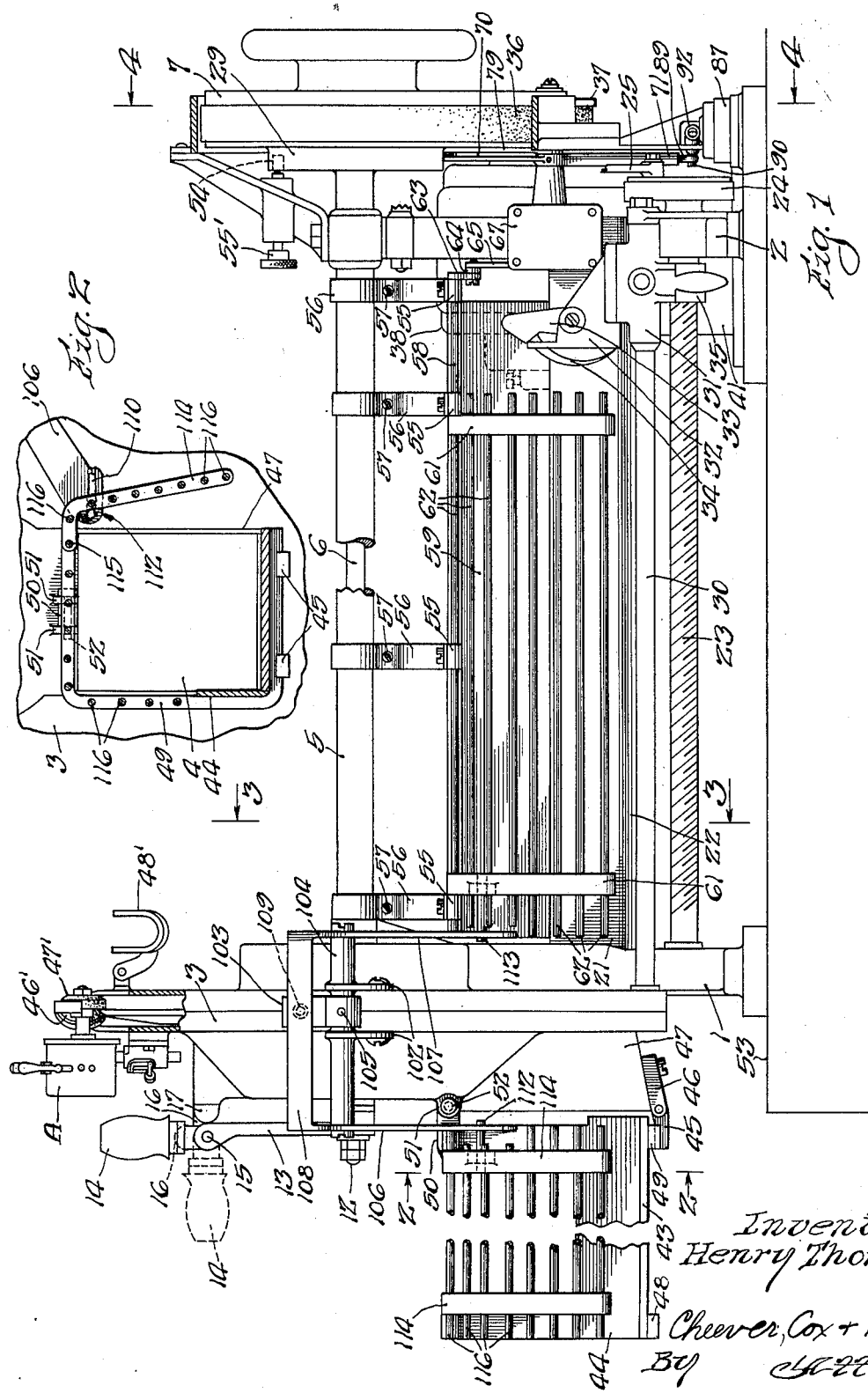
Inventor:
Henry Thomas
Cheever, Cox + Moore
BY
Attys.

May 29, 1934.  H. THOMAS  1,960,930
KNIFE GUARD FOR SLICING MACHINES
Filed April 9, 1931   5 Sheets-Sheet 2
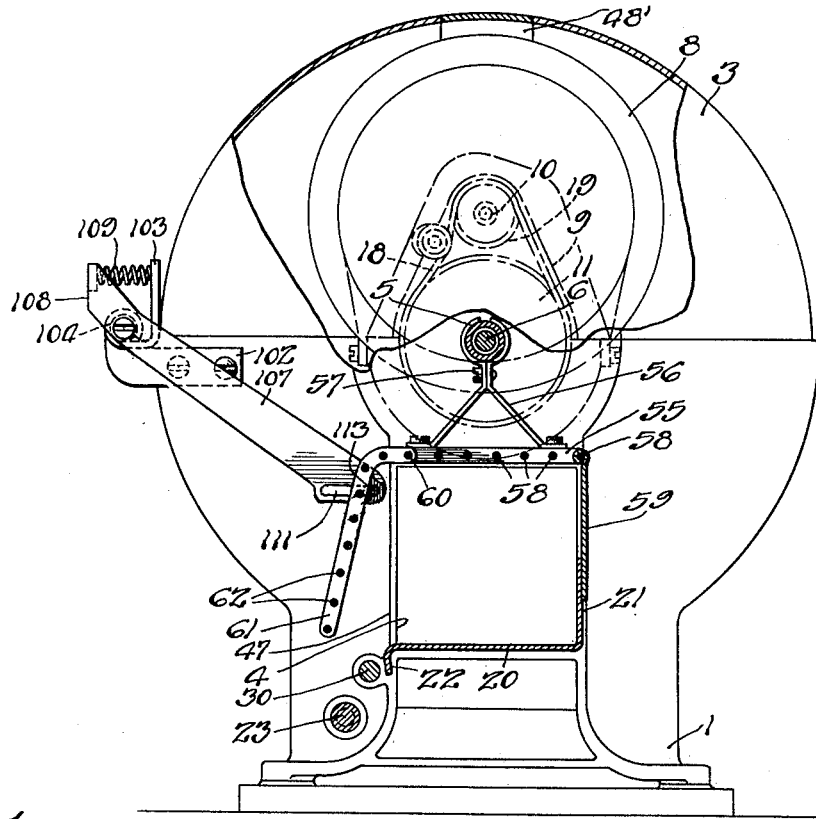

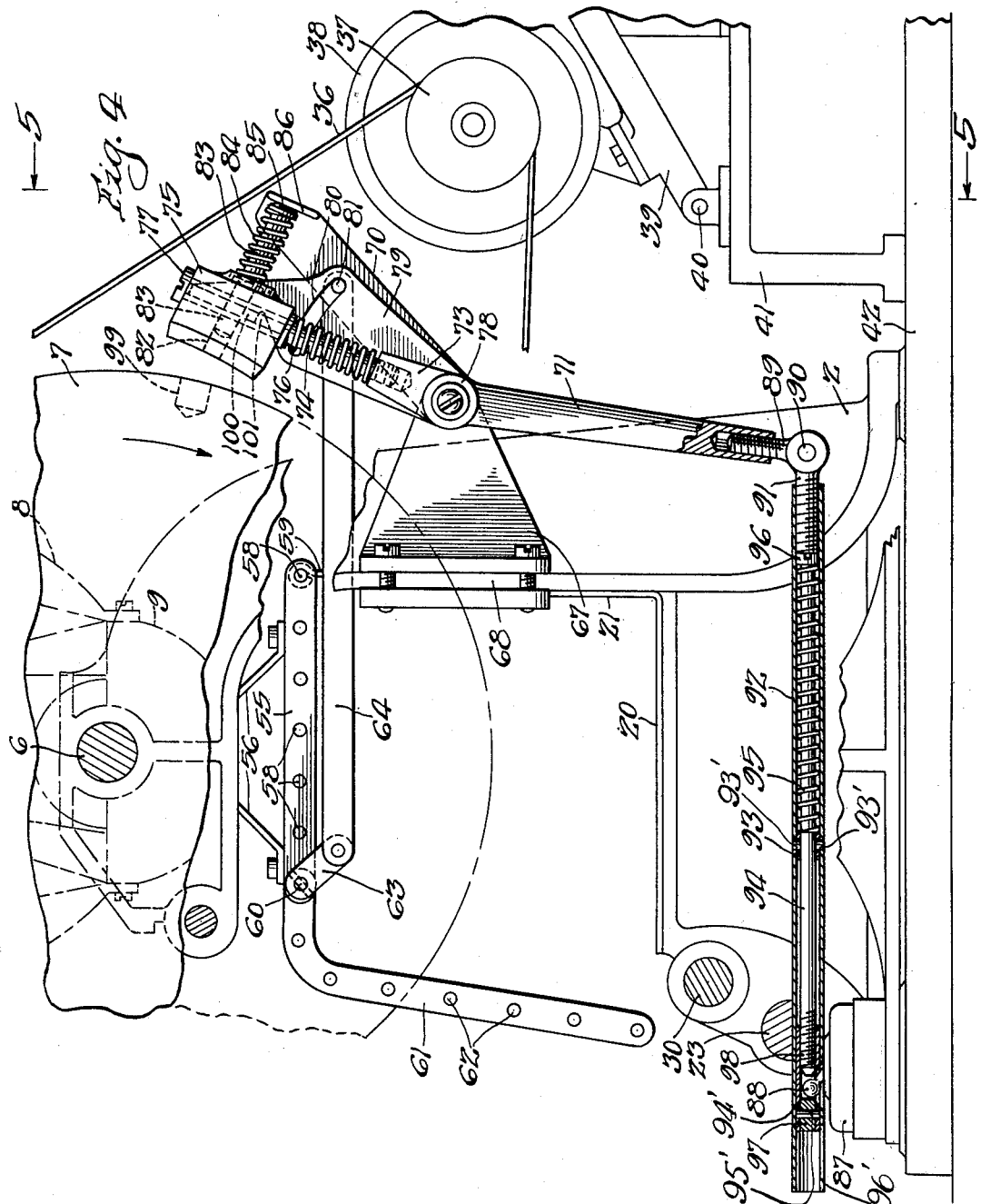

May 29, 1934.  H. THOMAS  1,960,930
KNIFE GUARD FOR SLICING MACHINES
Filed April 9, 1931   5 Sheets-Sheet 4
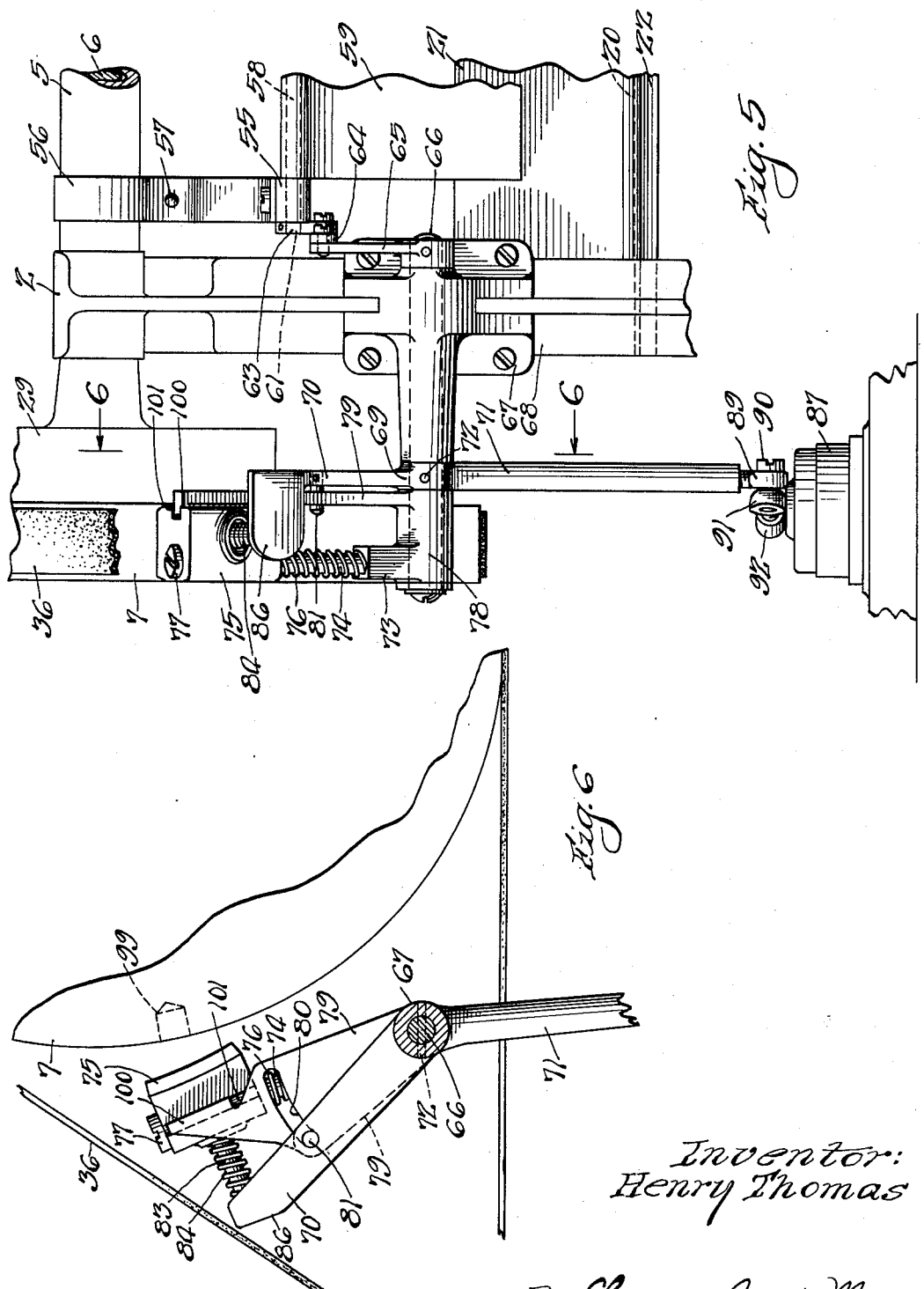
Inventor:
Henry Thomas
By Cheever, Cox & Moore
Attys.

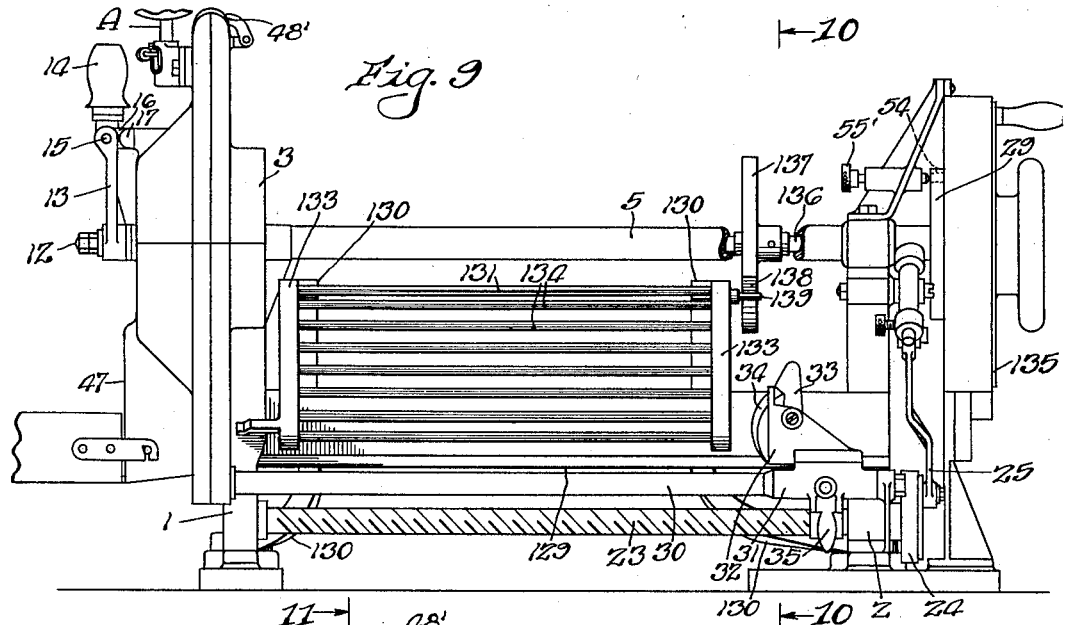
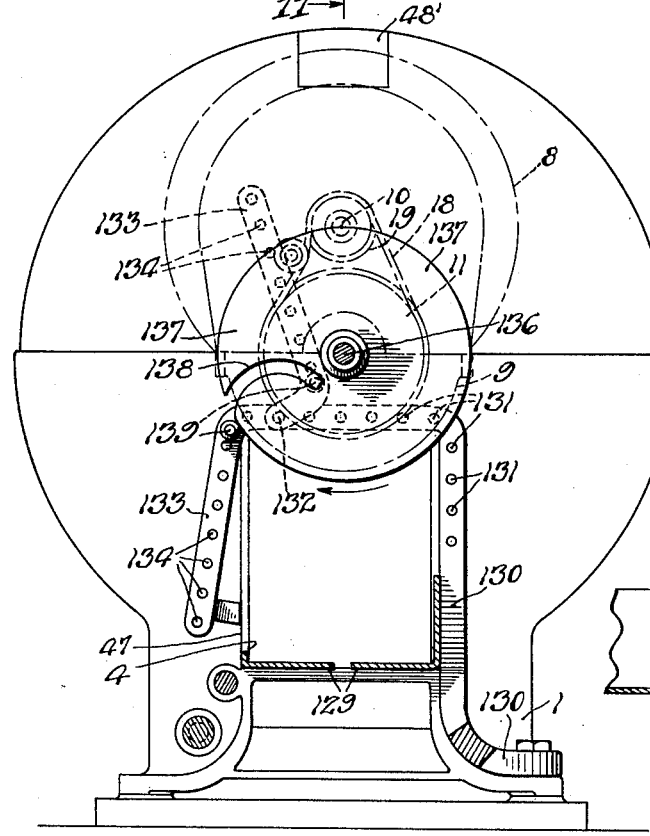
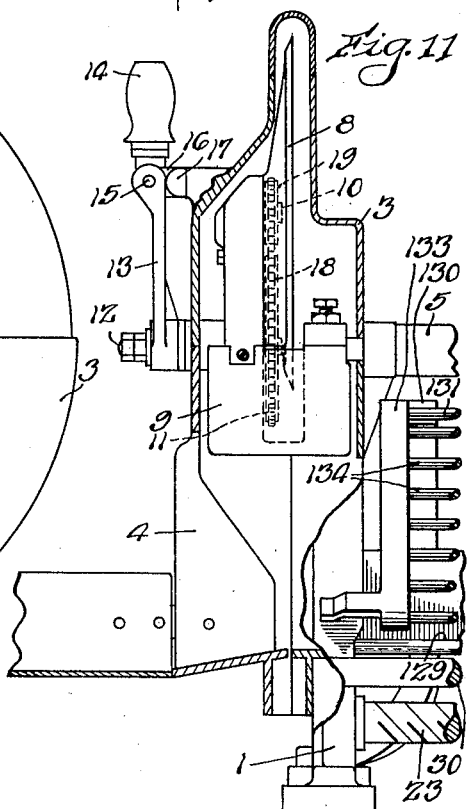

Patented May 29, 1934

1,960,930

UNITED STATES PATENT OFFICE 1,960,930

KNIFE GUARD FOR SPLICING MACHINES

Henry Thomas, Barking, England, assignor to U. S. Slicing Machine Company, La Porte, Ind., a corporation of Indiana Application April 9, 1931, Serial No. 528,792
In Great Britain April 9, 1930

25 Claims. (Cl. 146—101)

The present invention relates to slicing machines and particularly to bread slicing machines, although its scope is not limited exclusively thereto. In this type of machine the bread or other substance being sliced is moved across the cutting plane of the knife and successive slices are cut therefrom as the knife rotates.

Machines of this nature, in most instances, are power driven, the power drive generally being an electric motor, although sometimes the same are driven by belts from a source of power remote from the slicing machine. This invention, however, is applicable to any type of slicing machine which is power driven and in one embodiment shown in the drawings the invention is shown applied to a manually driven slicing machine.

In slicing machines of this nature the slicing knife is usually enclosed within a casing except at points where it is necessary to have the knife exposed for cutting purposes. In other words, there is generally one position in its path of travel that the knife is exposed and consequently an operator can become injured by placing his hands in a position to be cut by the knife if he is not careful. The particular machine to which this invention is applied carries an eccentrically mounted knife, i. e., one which is mounted to rotate about its own axis and also moves bodily about another axis eccentric to its own axis of rotation. The knife revolves bodily about its own axis in a substantially vertical plane and is counter balanced to offset the eccentric mounting of the knife.

Due to the inertia of the moving parts of the slicing machine the knife does not come to rest until after a considerable period of time has elapsed from the time when the power is disconnected or rendered inoperative to drive the knife. During that time the operator may wish to place another substance on the substance support to slice the same and in doing so his hand is apt to be placed too close to the knife and be injured.

It is to guard against injury to the operator that the applicant has developed the present invention. One object of this invention is therefore to protect the operator at all times from injury which might be done him by the knife. In order to accomplish this it is necessary that the operation of the guarding means which guards the operator be made substantially "fool-proof", as otherwise the device would not be as effective as desired.

Another object of this invention is to provide a knife guard which substantially prevents the operator from placing his hand in a dangerous position with respect to the knife at any time. The means for accomplishing this result is so designed that if the machine is in operation and the operator attempts to remove the guard, the result is that the machine is stopped and the knife is automatically moved to a position where the operator cannot be injured.

In one modification of applicant's invention the substance support or the slice receiver or both, are provided with guards which, when in place, will prevent the operator from positioning his hand in dangerous relation with the knife at its unguarded position in its path of travel thereof. If this guard is removed, the drive to the machine is automatically interrupted and mechanism comes into play for stopping operation of the knife very quickly.

A more specific object of this invention is to provide mechanically operated switches which are in the motor circuit and which are mechanically operated to turn off the power supply to the motor as soon as the guards are moved toward an inoperative position. In conjunction with the turning off of the motor, I prefer also to provide means whereby the motion of the knife is decelerated at a rate greater than normally would occur if no such means were provided. Such a means may take the form of a brake or other suitable devices and my invention is not limited precisely to the forms illustrated in the drawings.

Another object of this invention resides in providing a manually driven slicing knife with a guard which cannot be moved to an inoperative position unless the knife is at a predetermined position in its path of travel and stopped. Even in manually operated machines there is danger that the operator may be injured due to the fact that when the slicing knife comes to rest the same may be at its exposed position in its path of travel. With this particular arrangement the knife must be at other than its exposed position when the parts are in a position to permit the knife guard to be moved to inoperative relation with respect to the slicing machine.

Another object of this invention is to positively lock the slicing knife in a predetermined position when the motor has been rendered inoperative and the motion of the knife has been arrested.

Another object of this invention resides in the provision of means for rendering the knife inoperative and stopping the rotation thereof when one of the guards is removed bodily from the machine for the purpose of cleaning or for inspection or repair.

Other objects of this invention will appear hereinafter as the description thereof proceeds, the novel features, arrangements and combinations being clearly set forth in the appended claims.

Fig. 1 is a front elevation of a machine embodying my invention the parts being shown in operative positions.

Fig. 2 is a section taken substantially along the line 2—2 of Fig. 1.

Fig. 3 is a section taken substantially along the line 3—3 of Fig. 1.

Fig. 4 is a section taken substantially along the line 4—4 of Fig. 1.

Fig. 5 is a section taken substantially along the line 5—5 of Fig. 4, the motor and its support being removed for the sake of clearness.

Fig. 6 is a view taken on the line 6—6 of Fig. 5.

Fig. 7 shows a modification of the braking means illustrated in Figs. 4, 5 and 6.

Fig. 8 is a view of the mechanism shown in Fig. 7 looking from the right in that figure.

Fig. 9 is a side elevation of a manually operated slicing machine constructed according to my invention.

Fig. 10 is a cross section taken substantially along the line 10—10 of Fig. 9, and Fig. 11 is a vertical cross section through the knife housing shown in Fig. 9.

In the embodiment of my invention shown in Figs. 1 to 6 inclusive, the reference numerals 1 and 2 indicate end frame members which are adapted to support parts of the slicing machine. The frame member 1 supports a multi-parted hollow casing 3 which encloses the knife except at a point in the lowermost path of its travel where it is exposed through the opening 4, see particularly Figs. 2 and 3. The frame members 1 and 2 are connected together by a hollow tubular member 5 in which the drive shaft 6 for the knife is rotatably mounted. The right hand end of the shaft 6 as viewed in Fig. 1 carries a flywheel 7 and the left hand end thereof carries a knife which is mounted on the shaft substantially in the same manner as indicated in the patent to Stukart, No. 1,557,893, granted October 20, 1925 except that the knife is driven by means of a chain instead of by means of gears as in that patent. The chain drive that is used with this member is illustrated in the co-pending application of Arthur Ahrndt, Serial No. 332,790 filed January 16, 1929. The direction of movement of the knife is the same as in the aforesaid patent.

The knife illustrated best in Fig. 3 is indicated by reference numeral 8 and is rotatably mounted on the arm 9 secured to the shaft 6. The knife is rotatable about the axis 10. A sprocket 11 is secured to a shaft 12 rotatably mounted in a bearing in the casing 3, which shaft is in alignment with the shaft 6 but is not rotatable therewith. The shaft 6 has a crank 13 secured thereto as best illustrated in Fig. 1 and this handle is normally held stationary by means more fully described in the aforesaid application of Arthur Ahrndt. This means includes a handle 14 pivoted at 15 to the crank 13 and having a projection 16 adapted to lie between opposed projections 17 when the handle 14 is in its vertical position illustrated in Fig. 1. By holding the crank 13 stationary, the sprocket 11 will also be held stationary. A chain 18 is trained over the sprocket 11 and a sprocket 19, the latter being on the shaft 10 which supports the knife.

When the shaft 6 is rotated, the arm 9 rotates therewith, but the sprocket 11 remains stationary and the chain 18 rotates the knife shaft 10 through the intermediary of the sprocket 19. The shaft 6, as viewed in Fig. 5, rotates in a clockwise direction whereas the knife rotates about its axis in a counter-clockwise direction while being carried bodily in a clockwise direction about the axis of the shaft 6. When the knife is in the position shown in Fig. 3 it is wholly within the casing 3 and is not exposed at the opening 4. Therefore the operator cannot be injured by the knife if the knife is stopped at the position illustrated in this figure.

It is therefore a purpose of this invention to stop the knife preferably at the position shown in Fig. 3 whenever the guard for guarding the substance or the slices is moved toward inoperative position.

Mounted on the end frames 1 and 2 is a substance supporting trough 20 having an upwardly extending guard surface 21 at the rear thereof and a preferably downwardly extending portion 22 at the front thereof or at the right and left respectively, as illustrated in Fig. 3. A feed screw 23 is rotatably mounted in the end frame members 1 and 2 and has a one-way driving clutch 24 mounted on one end thereof and adapted to be intermittently rotated to feed a substance along a support. Preferably the clutch is actuated in the manner described in the aforesaid patent to Stukart or the patent application of William Mahler above referred to.

There is also a guide rod 30 non-rotatably mounted in the end frames 1 and 2 and a sliding member 31 which slides along the guide 30, and this sliding member carries an abutment plate 32 which has a pivoted arm 33 and brackets 34 used for the purpose of holding the bread against the abutment plate 32. The member 31 has a feed nut 35 thereon in operative engagement with the feed screw 23 so that when the feed screw is intermittently operated by the crank 25 the abutment plate 32 and consequently the bread, will be fed toward the cutting plane of the knife.

The flywheel 7 has a belt 36 trained thereover and over a flanged bolt 37 secured to the rotor of the motor 38. The motor 38 is carried by the bracket 39 pivoted at 40 to a bracket 41 which may be secured to the support 42 upon which the frame member 2 is mounted.

To the left of the cutting plane of the knife, as viewed in Fig. 1, is a slice receiver 43 which has a rear abutment plate 44 for preventing movement of the slices on the slice receiver in that direction. The knife has a tendency to move the slices toward that side of the slice receiver. The slice receiver is connected by the hinge butts 45 and 46 to the substantially U-shaped extension 47 on the casing 3. This permits the slice receiver to be dropped downwardly out of slice-receiving position.

There is one particular reason for desiring to drop the slice receiver out of its operative position and this reason is that when it is desired to sharpen the knife the crank 13 must be rotated and it is clear from an inspection of Fig. 1 that the crank cannot be rotated while the slice receiver and the guard therefor are in their operative positions, or even when the guard is moved to an inoperative position. Therefore I make provision for dropping the slice receiver out of operative position when desired. The slice receiver has secured thereto the brackets 48 and 49 of a shape substantially that illustrated in Fig. 2 in which the bracket 49 is shown as viewed from the left in Fig. 1. The brackets 48 and 49 extend under the slice receiver along the rear side thereof and then over the slice receiver, the portion of bracket 49 which lies over the slice receiver having an integrally formed lug 50 adapted to normally lie between adjacent spaced lugs 51 on the casing 3. The pin 52 passes through suitable openings in the lugs 50 and 51 to hold the slice receiver in its operative position. By merely removing the pin 52 the slice receiver may be pivoted in a counter-clockwise direction as viewed in Fig. 1 to an inoperative position which is generally vertical, the slicing machine being mounted generally on a support 53 with the slice receiver projecting over one edge thereof. This permits the slice receiver to swing downwardly and be suspended from the hinge butt 46 leaving sufficient room for the crank 13 to be operated by the handle 14.

When it is desired to sharpen the knife, the flywheel 7 is rotated to bring the opening 54 into registration with a pin 55' (see Fig. 1), which bolt is then moved to the right as viewed in Fig. 1 into the opening 54 to lock the flywheel and shaft 6 in a predetermined position, which position brings the knife into the upper part of the casing 3 as illustrated in Fig. 3. The handle 14 is then pivoted to its dotted line position illustrated in Fig. 1 and the crank rotated for the purpose of sharpening the knife. The shaft 6 remains stationary and the crank rotates the sprocket 11 and as a consequence the sprocket 19 through the intermediary of the chain 18. The grinding wheel 46' and 47' of the grinding unit A are arranged to engage opposite sides of the knife edge and in order to permit the grinders to be brought into engagement with the knife, the cover 48', pivoted to the casing 3, is moved to an inoperative position thus exposing the knife. The grinding unit is then rotated on its pivot and moved downwardly until the grinders engage their respective sides of the knife.

The invention so far described, with the exception of the pivoting of the slice receiver, is a description which would fit several machines upon which applicant's assignees have already filed applications, and the invention in this application resides in providing such a machine or other machines with novel means for protecting the operator in the operation of this device.

It will be noted that the knife passes the opening 4 recurrently and is not only rotated about the axis of the shaft 6 but also rotates about its own axis, thus giving a combined movement to the knife. The slicing operation is very rapid and the result is that if the operator should ever, for any reason at all, place his hands or his hand or any part of his body near the opening 4, disastrous results will take place. The knife is revolving with sufficient speed to probably cause complete severance of fingers and the like before the operator could even realize that he was being cut. Of course, machines of this nature, a great many times, are operated by inexperienced operators and if they are not careful the chances are that injury will result from the improper use of the machine.

I therefore desire to protect the operator by providing guards for both the substance support and for the slice receiver so that in the normal operation of the machine with the guards closed, the operator cannot bring his hands into a position where they might be injured by the knife. However, it is desirable that the guards be readily movable to an inoperative position so that a new substance may be placed on the substance support and the slices may be removed from the slice receiver as desired and without any great amount of trouble. However, if the guards can be moved to an inoperative position while the knife is rotating, the operator may, in removing the end of a substance which has been sliced, or in removing the slices, bring his hand or hands into contact with the rotating knife and the effectiveness of the guard would be partially destroyed.

Therefore it is one object of this invention to provide means whereby the knife is stopped whenever the guard is moved, or whenever either guard or both are moved. I will now proceed to describe the manner in which I accomplish this result.

Referring first to the substance guard, it will be noted by an inspection of Figs. 1 and 3 that it comprises an upper frame work having the bars 55 supported by the brackets 56 from the tubular casing 5, the brackets 56 being split as best illustrated in Fig. 3, and held together by the screws 57. The bars 55 support a plurality of rods 58 extending longitudinally of the machine. These bars remain in fixed position at all times. A plate 59 secured to one of the rods 58 at the rear of the machine hangs down and overlaps the upwardly extending guard surface 21, thus enclosing the rear of the substance support and preventing the operator from having access to the substance supporting surface 20 from the rear of the machine.

A rod 60 supported by bars 55 acts as a pivot for a guard which hangs down on the front side of the substance support, this guard comprising the bars 61 secured to the rod 60 and being provided with rods 62 similar to the rods 58. It is obvious that when the guard hangs down in front of the substance support that it is difficult for the operator to get his hands into a dangerous position, and it is only when this guard is lifted out of operative position that it is necessary to shut off the power to the motor 38. I therefore provide means whereby when the guard is lifted out of its operative position the motor is stopped, and preferably means are provided for slowing down the rotation of the shaft 6 at a rapid rate so that the knife comes to rest very quickly. This means is perhaps best illustrated in Figs. 4, 5 and 6. As already stated, the bars 61 are secured to the rod 60 so that when the guard is rotated the rod 60 must also rotate. Also secured to the rod 60 is a short arm 63 (Fig. 4) connected by a link 64 to an arm 65 (Fig. 5) secured to a shaft 66 rotatably mounted in a bracket 67 which is secured to an upwardly extending portion 68 of the frame 2. On the other end of the shaft 66 there is secured a bell crank 69 having the oppositely extending arms 70 and 71. The bell crank 69 is secured to the shaft 66 by the pin 72. Rotatably mounted on the shaft 66 is an arm 73 which carries an upwardly extending rod 74 upon which the brake shoe 75 is slidably mounted and urged upwardly by the spring 76. A screw 77 secured to the upper end of the rod 76 prevents upward movement of the shoe 75 under the influence of the spring 76. The arm 73 has a bearing portion 78 which also carries a plate 79 provided with an arcuate slot 80 in which the pin 81 on the arm 70 is adapted to travel.

The shoe 75 is provided with an opening 82 at right angles to the opening therein in which the rod 74 is arranged. The opening 82 is substantially perpendicular to the periphery of the flywheel 7 for a purpose which will appear presently. A sliding bolt 83 slides in the opening 82 and is spring-pressed to the right as viewed in Fig. 4 by means of the spring 84 which surrounds the sliding bolt and abuts against the shoe and the head 85 of the bolt. Movement of the bolt out of the opening 82 is prevented by the engagement of the head 85 with the flat lug 86 formed integrally with the arm 70.

The switch 87 having the toggle 88 is provided for switching the power on and off to the motor for starting and stopping the machine. The arm 71 has an adjustable eye bolt 89 threaded in the end thereof, as best illustrated in Fig. 4 pivotally connected at 90 to another threaded bolt 91 which is threaded in the end of the tubular member 92. An annular bearing member 93 forming an abutment member is rigidly fixed within the tubular member 92 as by pins 93' and slidably receives the rod 94 which is normally spring-pressed to the right by spring 95, the spring operating against the head 96 and the bearing member 93 and being limited in its movement to the right by the position of the threaded bolt 91. A sleeve 94' fitting snugly within the tubular member 92 is threaded onto the end 98 of rod 94 and consequently moves therewith. The head of the toggle 88 is arranged between the fixed abutment 97 and the end 98 of the rod 94. An abutment 97 is fixed to the end of the sleeve 94' by pins 95'. The switch is connected by suitable wiring to the motor, and since this is a common construction, no other illustration therefor is believed to be necessary. The tube 92 is provided with a slot extending longitudinally thereof so as to permit the stem of the toggle 88 to move relative to the tube while the spring 95 is compressed.

The operation of the mechanism just described is as follows: The operator lifts the guard out of operative position or toward inoperative position, thus rotating the rod 60, and consequently the arm 63, in a clockwise direction. The first movement of the arm 63 to the left, as viewed in Fig. 4, causes the link 64 to rock the bell crank 69 about its pivot, thereby moving the arm 71 in a counter-clockwise direction, and the tubular casing 92 to the right. The movement of the tubular casing 92 to the right acts through the spring 95 to push rod 94 and so abutment 97 to the right with a yielding pressure until the toggle 88 (which is shown in "on" position in Fig. 4) has been thrown as far as it will go to the right. Continued movement of the arm 71 in a counter-clockwise direction carries the casing 92 therewith, but this merely compresses spring 95 and does not move rod 94 farther since toggle 88 has reached its extreme right hand position and holds abutment 97 which holds rod 94 from further movement to the right.

The motor is shut off during the first movement of the bell crank. As the bell crank continues its movement, the brake shoe 75 is brought into engagement with the periphery of the flywheel 7, for when the bell crank moves, the pin 81 also moves, and permits the counter-clockwise movement of the plate 79 and arm 73, the latter carrying the brake shoe. The spring 84 holds the sliding bolt 83 in its inoperative position until the brake shoe contacts with the periphery of the flywheel 7. The first action of the brake shoe is, of course, to retard the movement of the flywheel and consequently movement of the knife. Continued movement of the bell crank due to movement of the guard toward inoperative position causes the arm 70 to move towards the periphery of the flywheel and since the shoe 75 is stopped by its engagement with the flywheel, the lug 86 moving against the head of the bolt 83 causes the bolt to slide toward the periphery of the flywheel and enter the opening 99 in the periphery of the flywheel when the opening 99 comes adjacent thereto, thus positively locking the flywheel and the knife against further rotation.

Provision must be made for taking up the shock imparted to the bolt 83 and shoe 75 due to the entering of the bolt 83 into the opening 99 in the flywheel. This means has already been described and comprises spring 76 acting on the underside of the shoe 75. It is quite evident that when the bolt 83 enters the opening 99 of the rotating flywheel 7 the shoe 75 will tend to move downwardly along the rod 74 against the action of the spring, which spring acts as a shock absorber and quickly brings the flywheel to rest without undue jar to the machine.

The arm 79 also acts as a support for the brake shoe and for this purpose has a tongue 100 entering a groove 101 in the side of the shoe. Thus both sides of the shoe are supported and the shoe may move downwardly along the rod 74 without being retarded by its connection with the plate 79. The result of this arrangement is that by the time the guard is moved to its inoperative position the power is cut off and the knife has ceased to rotate. It is preferred that the opening 99 be so arranged in the periphery of the flywheel that the knife will be in the position illustrated in Fig. 3 when the bolt 83 enters the opening 99. In this way there is no possibility of the operator being injured.

Of course it is obvious that the motion of the flywheel 7 may be stopped at other places than at that described, for the mere stopping of the rotation of the knife will in itself prevent any substantial amount of injury. The only injury which would result from an operator bringing his hand into contact with the stationary knife is not apt to be very great, for a stationary knife does not have the terrific slicing effect which is made possible by the rotating of the knife about its own axis and also about an axis eccentric to the axis of the knife.

I will now proceed to describe the manner in which the guard for the slice receiver and the guard for the substance support are interlocked for the purpose of causing the stopping of the knife when either of the guards is operated. This means is constructed in the following manner:

A rod 115 extending between the brackets 48 and 49 which are secured to the slice receiver, acts as a pivot about which the movable part of the guard is moved when the guard is moved to inoperative position. The guard itself comprises the bars 114 secured to which are the rods 116.

The front edge of the casing 3 is provided with a bracket (see Figs. 1 and 3) having the attaching lugs 102 secured to the opposite sides of the casing, and an upstanding plate 103 is secured to a solid shaft-like portion 104 by means of a pin 105. Levers 106 and 107, connected together by means of a tie piece 108 formed integrally with the levers 106 and 107, is spring-pressed in a counter-clockwise direction by means of the spring 109 shown best in Fig. 3. Both levers 106 and 107 are pivoted to the ends of the shaft-like portion 104 and have slots 110 and 111 in their lowermost ends, as is best illustrated in Figs. 2 and 3. Pins 112 and 113 secured to adjacent bars 114 and 61 operate within the slots 110 and 111 so that whenever one of the guards is moved, the other guard must be moved in unison therewith.

With the arrangement just described it will be apparent that when the guard over the slice receiver is moved to an inoperative position the other guard over the substance support will also be moved to an inoperative position due to the pin and slot connections between the levers 106 and each of the guards and also due to the fact that tie member 108 causes one of the levers to move whenever the other of the levers is actuated by its respective guard member.

The spring 109 is sufficiently strong to lift one of the guards into an inoperative position but is not sufficient to move both guards to an inoperative position. Therefore, normally the guards remain in an operative position unless moved to an inoperative position by the operator. The reason for having the spring of the strength referred to is so that whenever the slice receiver is moved downwardly about its pivot to an inoperative position the pin and slot connection 112—110 will be broken and the spring will move the other of the guards, namely the one over the substance support, to an inoperative position thereby turning off the motor and applying the brake in the manner previously described.

In other words, with the arrangement which has been described so far, whenever the knife is exposed in such a manner that the operator might accidentally come into contact therewith, the motor is shut off and the knife is stopped in a position in which it can do no harm. At least the knife will be stopped.

In Figs. 7 and 8 I have shown a modified arrangement whereby the brake may be of a much simpler form. In this form of the invention the same reference numerals refer to corresponding parts in Figs. 1 to 6 inclusive. The link 64 operates an arm 117 secured to the shaft 118 and thereby causes a rotation of the shaft whenever the link 64 is reciprocated in the manner described in connection with Figs. 1 to 6 inclusive. The shaft 118 also has an arm 119 secured thereto and this has a pin 120 rigid therewith operating within an arcuate slot 121 in the arm 122 rotatably mounted on the shaft 118, but being held on such shaft by means of the screw 123. A coiled spring 124 having one end thereof operatively secured to a lug 125 rigid with the shaft 118 has the opposite end thereof provided with an extension 126 which lies behind the arm 122 and urges the same in a direction toward the flywheel. The link 64 positively holds the arm 122 away from the flywheel and when the link is moved to the left, as viewed in Fig. 7, the spring urges the arm 122 to the left and brings the brake shoe 127 formed integrally therewith into operative engagement with the periphery of the flywheel, thereby stopping the rotation of the flywheel and of the slicing knife. The arm 119 forms one arm of a bell crank in which the other arm 128 corresponds to the arm 71 shown in Fig. 4 and this arm is operatively connected to a device for controlling the switch 87 constructed in the manner illustrated in Fig. 1, or in any other suitable manner.

A still further modified form of my invention is shown in Figs. 9, 10 and 11. In this form of the invention there is a substance receiving surface 129 and a guard comprising the castings 130 between which are arranged the rods 131. One of the rods extending between the castings 130, namely the rod 132, acts as a pivot for the castings 133 which carry the rods 134 and form a guard for the front side of the substance support similar to that illustrated in the previous figures. The flywheel 135 is secured to a shaft 136 which carries the knife 8 which is mounted the same as the knife 8 shown in Figs. 1 to 6 inclusive. Similar reference characters in Figs. 9 and 10 refer to the corresponding parts in Figs. 1 to 6 inclusive. To the shaft 136 is also secured a disc 137 having an arcuate slot 138 therein, adapted to receive a pin 139 secured to the adjacent casting 133. It is readily apparent from an inspection of Fig. 10 that the pin 139 will not enter the slot 138 except when the flywheel is in one position of rotation, this position being the one preferably wherein the knife is in its elevated position within the casing as indicated by the dotted lines in Fig. 10 and full lines in Fig. 11.

In the modification illustrated in Figs. 1 to 6 inclusive, it is obvious that the pin 55' is not absolutely necessary for the sliding bolt 83 may be used in place of the pin 55'. However, with a brake shoe as indicated in Figs. 7 and 8 it will still be necessary to use the pin 55' to lock the knife in proper position for grinding or to lock the knife in the upper part of the casing so as to put it out of a position where the operator might be injured.

Obviously other changes may be made in the particular arrangement of the parts and in the combinations therefor without departing from the spirit of this invention or the scope of the appended claims. Therefore I do not wish to be limited except as specified hereinafter by the claims.

Having thus described my invention, what I claim as new and desire to secure by Letters Patent is:

1. In a slicing machine, the combination with a movable slicing knife of a casing for substantially enclosing said knife throughout its path of movement except at the position where the substance is sliced, and a movable guard normally preventing access to said knife at said position, but movable to inoperative position to permit access to the substance being sliced, and means operable by said guard as it moves to inoperative position for compelling the stopping of said knife at a position within said casing other than at the said slicing position.

2. In a slicing machine, the combination with a knife support, of a knife rotatably mounted on said knife support, of a casing for enclosing said knife and support, said casing having an opening therein through which the substance to be sliced is adapted to pass, to carry said substance past the cutting plane of said knife, means for preventing contact with said knife by an operator without interfering with movement of said substance through said opening while said knife is moving, said means being movable to inoperative position to permit positioning a substance in a position to be acted upon by said knife, and means for stopping movement of said knife when said first mentioned means is moved toward inoperative position, including means for compelling said knife to stop at a position other than adjacent said opening.

3. In a slicing machine, the combination with a slicing knife, power means for rotating said knife, means for guarding said knife, movable to an inoperative position permitting access to said knife, means connecting the guard and power means and operable upon movement of said guard toward inoperative position for rendering said power means inoperative, and means other than the inherent friction between the moving parts while said slicing machine is operating for decelerating the movement of said knife to zero after said power means has been rendered inoperative at a rate greater than would normally occur without said decelerating means.

4. In a slicing machine, the combination with a slicing knife, power means for rotating said knife, means for guarding said knife, movable to an inoperative position permitting access to said knife, means connecting the guard and power means and operable upon movement of said guard toward inoperative position for rendering said power means inoperative, and means other than the inherent friction between the moving parts while said slicing machine is operating for decelerating the movement of said knife to zero after said power means has been rendered inoperative, comprising a brake compelled to be automatically brought into operative contact with a part rotatable with said knife if and when said power means is rendered inoperative.

5. In a slicing machine, the combination with a knife, power means for operating said knife, a substance support on one side of the cutting plane of said knife, a slice receiver arranged on the other side of said knife, a guard arranged over said support, a second guard arranged over said slice receiver, said guards being mounted so as to be movable to inoperative positions and being operative to prevent accidental contact with the cutting edge of said knife by the operator when the same are in operative positions, interconnecting means operatively connecting said guards so as to cause them to be moved in unison with each other whenever one of said guards is moved, and means operated by the movement of either of said guards to inoperative position for stopping the rotation of said knife.

6. In a slicing machine, the combination with a knife, power means for operating said knife, a substance support on one side of the cutting plane of said knife, a slice receiver arranged on the other side of said knife, a guard arranged over said support, a second guard arranged over said slice receiver, said guards being mounted so as to be movable to inoperative positions, and being operative to prevent accidental contact with the cutting edge of said knife by the operator when the same are in operative positions, interconnecting means operatively connecting said guards so as to cause them to be moved in unison with each other whenever one of said guards is moved and means operated by the movement of either of said guards to inoperative position for stopping the rotation of the knife and for locking said knife in a predetermined position.

7. In a slicing machine, the combination of a slicing knife, power means for actuating said knife, a guard arranged over the substance being sliced, a second guard arranged over the slices after they are cut, interconnecting means for causing simultaneous operation of said guards when one of said guards is moved, a means for normally urging said guards to inoperative position, but being of insufficient capacity to move both of said guards out of operative position simultaneously although sufficient to move one of said guards to inoperative position, one of said guards being detachably mounted in operative position with relation to said knife, and means operated by the removal of said last mentioned guard for rendering said power means inoperative to drive said knife.

8. In a slicing machine, the combination of a slicing knife, power means for actuating said knife, a guard arranged over the substance being sliced, a second guard arranged over the slices after they are cut, interconnecting means for causing simultaneous operation of said guards when one of said guards is moved, a means for normally urging said guards to inoperative position, but being of insufficient capacity to move both of said guards out of operative position simultaneously although sufficient to move one of said guards to inoperative position, one of said guards being detachably mounted in operative position with relation to said knife, and means operated by the removal of said last mentioned guard for rendering said power means inoperative to drive said knife and for causing deceleration of said knife at a rate which is more than normally would occur.

9. A device as claimed in claim 7 in which the knife is movable to a knife sharpening position, said knife sharpening position being one position occupied by said knife during its normal travel and in which means is provided for automatically locking said knife in knife sharpening position when said power means is rendered inoperative.

10. In a slicing machine, the combination with a power driven knife, means operable to discontinue the actuation of said power means, and a brake for slowing down the rotation of said knife after said power means is rendered inoperative comprising an arm, a brake shoe rigidly carried by said arm having means associated therewith for normally urging said brake toward operative braking position, and means for holding said brake out of operative position at all times except when said power means is inoperative.

11. In a slicing machine, the combination with a moving knife, of power means for actuating said knife, means movable with said knife having a braking surface thereon, a recess in said surface, a brake opposed to said surface, a locking pin associated with said brake, yielding means for normally urging said brake into operative position against said surface, and means for holding said brake out of operative position while said power means is operative, said last mentioned means being rendered inoperative when said power means is rendered inoperative, said locking pin being adapted to enter said recess subsequent to the engagement of said brake with said member which is movable with said knife to automatically stop said knife at a predetermined position and hold said knife in that position.

12. In a slicing machine, the combination with a knife, of a substance support mounted on one side of the cutting plane of said knife, a slice receiver mounted on the other side of said knife, means for moving said knife and substance support relative to each other so that slices are cut from a substance on said substance support, a guard over said substance support, a guard over said slice receiver, detachable inter-connecting means between said guards for causing said guards to be moved in unison with each other, said slice receiver being movable to an inoperative position, and said guard over said slice receiver being movable with said slice receiver to said inoperative position, said detachable connection between said guards becoming inoperative upon movement of said slice receiver to inoperative position, said detachable connection becoming automatically detached, and means automatically operable when said guards are detached from each other for stopping said relative movement between said knife and support.

13. In a slicing machine, the combination with a knife, of a substance support mounted on one side of the cutting plane of said knife, a slice receiver mounted on the other side of said knife, means for moving said knife and substance support relative to each other so that slices are cut from a substance on said substance support, a guard over said substance support, a guard over said slice receiver, detachable inter-connecting means between said guards for causing said guards to be moved in unison with each other, said slice receiver being movable to an inoperative position, and said guard over said slice receiver being movable with said slice receiver to said inoperative position, said detachable connection between said guards becoming inoperative upon movement of said slice receiver to inoperative position, said detachable connection becoming automatically detached, and means automatically operable when said guards are detached from each other for stopping said relative movement between said knife and support and for locking the knife in a predetermined position relative to said support.

14. In a slicing machine, the combination with a slicing knife, of a casing for said slicing knife, an opening in said casing through which the substance to be sliced is moved during the slicing operation, guards on opposite sides of said opening, power means for actuating said knife, a connection between one of said guards and said power means for rendering said power means inoperative to drive said knife when said guard is moved to an inoperative position, and interconnecting means between said guards whereby the movement of either guard operates the other and controls said power means in the manner set forth.

15. A device as claimed in claim 14 in which said guards also operate a braking device which stops the rotation of the knife after said power means is rendered inoperative.

16. In a slicing machine, the combination with a slicing knife, of a support on one side of the cutting plane of the knife for supporting the substance to be sliced, a guard over said substance support, a guard arranged on the opposite side of said cutting plane for protecting the operator without interfering with the discharge of the slices after they are severed by said knife, a movable member having operative engagement with both of said guards, means operating on said movable member for urging said movable member in a direction to move said guards into inoperative position but having only sufficient energy to lift one of said guards and not both of said guards, one of said guards being movable to a position where it is not connected to said movable member whereby when said guard is disengaged from said movable member, said means for operating said movable member will actuate the same and move the other of said guards to an inoperative position, and means operated by the movement of said last mentioned guard to an inoperative position for stopping the rotation of said knife.

17. A device as claimed in claim 16 in which said knife is power driven through the intermediacy of a belt trained over a pulley operatively connected to said knife and in which said means for stopping the rotation of said knife includes means for disconnecting the power drive to said belt, and means for engaging said pulley to stop the rotation thereof after said power drive is rendered inoperative.

18. A device as claimed in claim 16 in which said knife is power driven through the intermediacy of a belt trained over a pulley operatively connected to said knife and in which said means for stopping the rotation of said knife includes means for disconnecting the power drive to said belt, and means for engaging said pulley to stop the rotation thereof after said power drive is rendered inoperative, said brake being also associated with a locking means for engaging with a cooperating means on said pulley whereby the knife is stopped in a predetermined position with respect to said support.

19. In a slicing machine, the combination with a knife, a support for the substance to be sliced, a guard for said support and for said knife to protect the operator, a power means for driving said knife, a connection between said guard and said power means for rendering said power means inoperative when said guard is moved to an inoperative position, and a brake for stopping the rotation of said knife when said power means is rendered inoperative, comprising a brake-shoe movable into and out of engagement with a part movable with said knife and fixed with relation to said knife, said brake-shoe being inter-connected with the means for rendering said power means inoperative so that when said power means is rendered inoperative said brake-shoe becomes operative for the purposes set forth.

20. In a slicing machine, the combination with a slicing knife, power means for driving said knife, a member bearing fixed relation to said knife and rotating therewith, a brake-shoe connected to said power means and controlled thereby to move into engagement with said member if and when said power means is rendered inoperative, and inter-locking means associated with said brake-shoe and said member movable into inter-locking position after said brake-shoe is applied to said member for stopping the rotation of said member in a predetermined position.

21. In a device for stopping the rotation of knives for slicing machines, the combination with a fly wheel directly connected with said knife to move therewith, an opening in the outer periphery of said fly wheel, a brake shoe for engaging the periphery of said fly wheel, an arm upon which said brake-shoe is yieldingly mounted, a pin extending through said brake-shoe but normally retracted below the braking surface thereof by a yielding means, and means for successively moving said brake-shoe and said pin against the periphery of said fly wheel whereby the rotation of said fly wheel is slowed down by said brake-shoe, and said fly wheel is stopped by the movement of said pin into said opening after said opening arrives at a position to receive said pin.

22. In a slicing machine, the combination with a knife, of a substance support, a guard for said substance support, a fly wheel rotatable with said knife, an arm pivoted adjacent said fly wheel, a brake-shoe slidably mounted on said arm and yielding held in a normal position on said arm at one position in its permitted path of travel on said arm, means for moving said arm to bring said brake-shoe into engagement with said fly wheel comprising means connected to said guard operable upon movement of said guard to an inoperative position, power means for actuating said fly wheel, and means operable by the movement of said guard to inoperative position for rendering said power means inoperative and thereafter compelling the operation of said brake.

23. A device as claimed in claim 22 in which said brake-shoe and fly wheel are provided with a pin and an opening respectively adapted to register with each other when said fly wheel reaches a predetermined position and in which said pin is spring-pressed normally below the braking surface of said brake-shoe but is moved to a position projecting from said brake-shoe when said opening arrives at a position in registration with said pin, whereby said pin enters said opening and stops the rotation of said fly wheel at a predetermined position.

24. In a slicing machine, the combination with a slicing knife, a drive shaft upon which said knife is mounted, a disk secured to said shaft and rotatable therewith, a substance support, a guard for said substance support pivoted about an axis substantially parallel with said shaft, a pin on said guard and movable therewith, said pin normally lying in a position adjacent the periphery of said disk while said guard is in operative position, an arcuate slot in said disk extending from the periphery thereof substantially toward said shaft for receiving said pin when said shaft is in a predetermined position of rotation so that the movement of said guard to an inoperative position is prevented except when said shaft is at that position of rotation, said arcuate slot being concentric with the pivot for said guard when said pin is in a position to be received within said slot.

25. A braking means for stopping the rotation of a slicing knife comprising a brake-shoe for engaging a part rotatable with said knife, a locking pin associated with said brake-shoe, an opening in said part movable with said knife, means for moving said brake-shoe into engagement with said part, and means for thereafter moving said pin against said part until said opening presents itself in a position adjacent said pin, said means moving said pin into said opening to stop the rotation of said part and consequently of said knife, said locking pin extending through the brake-shoe, said brake-shoe being yieldingly mounted so as to be able to move against a yielding resistance in the direction of rotation of said part in which said opening is provided so that when said pin enters said opening the brake-shoe can move bodily with said part while stopping the rotation thereof.

HENRY THOMAS.

CERTIFICATE OF CORRECTION.

Patent No. 1,960,930.　　　　　　　　　　　　　　　　　May 29, 1934.

HENRY THOMAS.

It is hereby certified that error appears in the printed specification of the above numbered patent requiring correction as follows: In the title of invention in the grant, and in the heading to the printed specification for "SPLICING" read SLICING; and that the said Letters Patent should be read with these corrections therein that the same may conform to the record of the case in the Patent Office.

Signed and sealed this 24th day of July, A. D. 1934.

Bryan M. Battey

Acting Commissioner of Patents.

(Seal)